E. J. BLAKE.
SYSTEM OF SPEED CONTROL.
APPLICATION FILED JUNE 14, 1919.
1,388,917.
Patented Aug. 30, 1921.
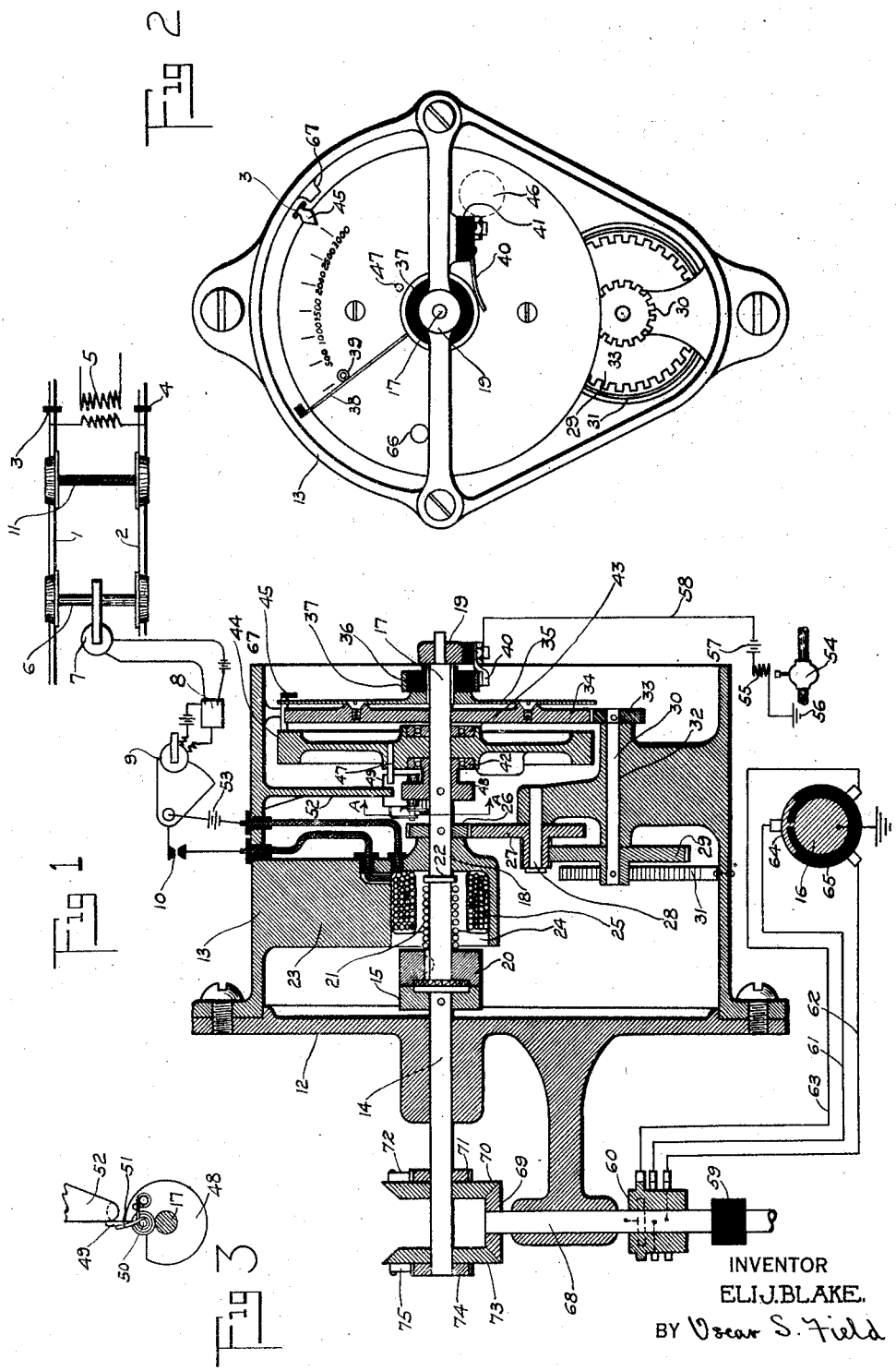
INVENTOR
ELI J. BLAKE.
BY Oscar S. Field
ATTORNEY

UNITED STATES PATENT OFFICE.

ELI J. BLAKE, OF BUFFALO, NEW YORK, ASSIGNOR TO HALL SWITCH & SIGNAL CO., A CORPORATION OF MAINE.

SYSTEM OF SPEED CONTROL.

1,388,917. Specification of Letters Patent. Patented Aug. 30, 1921.

Application filed June 14, 1919. Serial No. 304,293.

*To all whom it may concern:*

Be it known that I, ELI J. BLAKE, a citizen of the United States, and a resident of Buffalo, county of Erie, State of New York, (whose post-office address is care of Gould Coupler Company, Depew, New York,) have invented certain new and useful Improvements in Systems of Speed Control, of which the following is a specification.

Whereas in prior applications I have disclosed means of inductively collecting energy in the running rails of the track to control apparatus on a locomotive or car, it is the object of the present invention to provide means whereby this energy may be caused to control the speed of the vehicle in accordance with the track conditions and the energy received from the running rails.

In order to obtain a practical speed control of this nature it is necessary to provide apparatus which is adapted to automatically conform to predetermined speed reduction or braking curves which represent definite permissible speeds at certain definite distances from a point of initial application, these permissible speeds ultimately reaching zero or a predetermined minimum speed at a predetermined distance of travel beyond the point of initial application. It is obvious that the speed curve may be arranged to conform to the braking effect of the standard braking equipment on the vehicle and that the apparatus may be caused to conform to a braking curve which will have a certain margin above the true braking curve in order to allow the engine man an opportunity to control his vehicle without being tripped by the speed control apparatus. In the event of the engine man exceeding the permissible speed as determined by the apparatus the device is adapted to automatically apply the brakes and bring the vehicle to a stop.

One object of the present invention is to provide a speed controlling device which will automatically apply the brakes to the vehicle should the engineman fail to conform to the necessary speed reduction curves to bring his train to a stop at a definite point.

Another object is to provide means whereby the mechanical transmission of motion from the axle to the mechanism is automatically checked against breakage.

A further object is to provide a mechanism which will furnish a means of controlling the speed of the vehicle in accordance with an approximation to a true braking curve.

Another object is to provide an indication whereby the engineman may known the allowable running condition at all times.

With these and further objects in view which will become apparent from the accompanying description I will now proceed to describe the mechanism as disclosed in the drawings.

Figure 1 is a longitudinal section through the device showing circuits which are employed to control the same from the running rails.

Fig. 2 is a front elevation of the device.

Fig. 3 is a sectional detail taken through *a—a* of Fig. 1.

In the upper part of Fig. 1, I have shown a short section of track comprising running rails 1 and 2 which are provided with insulated joints 3 and 4. A feeding transformer 5 is shown connected across these rails and is adapted to furnish alternating current energy to the same. I also show a front anxle of a vehicle 6 across the rails having the core and secondary winding of a transformer 7 mounted thereon. The secondary winding of the transformer 7 is connected through an amplifier 8, of any suitable type such as the "audion," to an alternating current relay 9 which is adapted to control contact 10. These circuits are so arranged that when energy from transformer 5 passes through axle 6, the relay 9 will be energized and contact 10 will be closed. A shunting axle 11 is shown which may be the rear axle on another vehicle, bridging the rails 1 and 2 thereby shunting energy from axle 6 and leaving relay 9 deënergized and contact 10 open. This circuit is described more fully in my application Serial No. 135,120.

The speed control apparatus comprises a base 12 mounted on the vehicle in any suitable manner and insulated therefrom. This base is adapted to carry a frame 13 which supports the controlling mechanism. Journaled in base 12 is a shaft 14 which is provided with a positive clutch end 15. Shaft 14 is connected through a ratchet spring pawl, and bevel gear 71, 72, 70, or 74, 75, 73, according to the direction of rotation, to a bevel pinion 69, mounted on a shaft 68, and driven through an insulating coupling 59 by any suitable mechanism from an axle of the vehicle. The shaft 14 thus revolves always in a counter clockwise direction, at a speed proportional to that of the vehicle.

Axially in line with shaft 14 is a second shaft 17 journaled at 18 and 19 respectively. The shaft 17 is provided with clutch member 20 adapted to slide but locked against rotation thereon and also adapted to engage with the clutch member 15 on shaft 14 and to be normally held in engagement by means of a spring 21 acting against a collar 22 on shaft 17. The clutch member 20 is made of suitable magnetic material. Frame 13 is made of magnetic material such as cast iron and is provided with an extending member 23 which has a cavity 24, in axial relation to shaft 17. A winding 25 is provided within the cavity 24 which when energized will cause the clutch member 20 to be drawn away from the clutch member 15 as it is obvious that the foregoing parts will comprise what is commonly known as an iron clad magnet, the clutch member 20 constituting the armature. It will therefore be seen that when coil 25 is deënergized clutch members 15 and 20 will be held in engagement by means of spring 21 and shafts 14 and 17 will rotate in unison, but when coil 25 is energized the clutch members 15 and 20 will be disengaged and shaft 14 will be free to rotate independently of shaft 17. Rigidly mounted on shaft 17 is a pinion 26 which is adapted to transmit motion through gear and pinion 27, freely mounted on a spindle 28, to a second gear 29. The gear 29 is rigidly mounted on the shaft 30 and a clock spring 31 is attached to the shaft of this gear and to the frame 13 in such a manner that it will be wound up when the gear 29 is rotated in a counterclockwise direction. The spring 31 is of sufficient strength to return the mechanism to its initial starting point as will be hereafter described, and is provided with a sufficient number of convolutions to take care of the maximum length of controlled block without being over wound and thereby placed under excessive strain. The shaft 30 is journaled in a bearing support 32 and has a pinion 33 rigidly attached to the end opposite to gear 29. This pinion is adapted to engage a large gear 34 which is mounted on shaft 17 and adapted to freely rotate thereon. A dial 35 is mounted on gear 34 and an insulating drum 36 is attached thereto and adapted to carry a collector ring 37. This collector ring 37 is electrically connected to a flexible contact arm 38, more clearly shown at Fig. 2, which is normally held in engagement with the contact stop 39 by initial spring pressure in arm 38. Contact stop 39 is rigidly mounted on dial 35 and in electrical connection with the same and hence through the mechanism to ring contactor 60. Arm 38 and stop 39 both being carried on gear 34 rotate in unison and therefore constantly remain in contact unless member 45 is brought into contact with arm 38 in such a manner as to force the arm 38 away from the stop 39. The bearing member 19 is provided with an insulating block 41 which carries a contact spring 40 adapted to rub on collector ring 37 and make electrical contact therewith. A flexible lead may be used in place of collector ring 37 and contact spring 40 if desired. Behind the gear 34, freely mounted on suitable ball bearings 42 and 43 carried on shaft 17, is a fly wheel 44. This fly wheel is provided with a projecting arm 45 which constitutes a pointer and is adapted to operate in conjunction with figures on the dial 35 the purpose of which will hereafter be described. The fly wheel is further provided with a counter balance weight 46 which is adapted to normally work in approximately equal arcs of relatively small angle on either side of a horizontal line drawn through the axis of rotation of the fly wheel. It is desirable to keep the angle of motion of this weight as small as possible in order that the torque exerted by the same on the fly wheel 44 will be substantially constant. The arm 45 is normally held in engagement with a fixed stop 67 carried by frame 13 due to the action of counter balance weight 46. A pin 47 is carried by the fly wheel 44 and is adapted to project rearwardly from the same. The shaft 17 is provided with a collar 48, more clearly shown in Fig. 3, which is adapted to rotate in unison with the shaft. This collar is provided with a tripper member 49 pivotally mounted thereon at 50 and held in a position perpendicular to the shaft by means of a spring 51 as shown. This tripper 49 upon rotation of the shaft 17 in a clockwise direction in Fig. 3, or a counter clockwise direction in Figs. 1 and 2, is adapted to engage a projection 52 carried by the frame 13. The tripper 49 will therefore be depressed during each successive rotation of shaft 17 in order to allow the tripper 49 to pass under the projection 52.

At 54 I have shown diagrammatically an electrically controlled air valve adapted to apply the airbrakes on the vehicle when the coil 55 is deënergized. The coil 55 is in a normally closed circuit from ground 56 through coil 55, source of energy 57, wire 58, contact spring 40, collector ring 37, contact arm 38, contact pin 39 to the mechanism frame, which is insulated from the frame of the vehicle, through shaft 68 to three ring contactor 60, through either wire 61, 62 or 63 respectively to contact segment 64 insulatively mounted at 65 on axle 16, back to ground 56. It will be seen that as axle 16 rotates, contact segment 64 will alternately connect wires 61, 62 and 63 to the axle 16. The contact members on contactor 60 of shaft 68 may be of such a length and so arranged that they will alternately connect the shaft 68 to wires 61, 62, and 63 in the same sequence and at the same frequency as the contact segment 64 whereby the circuit through one wire is closed at or an instant prior to the time that it is opened through another one of the wires 61, 62 and 63 respectively. Thus if shaft 68 and axle 16 rotate in unison, a closed circuit will normally be constantly maintained between shaft 68 and axle 16. Should the transmission gearing between axle 16 and shaft 68 become disabled the synchronous change of connections will be disturbed, and in this event the circuit between axle 16 and shaft 68 will be intermittently broken at one or more points during a revolution of axle 16, thereby deënergizing coil 55 and applying the brakes to the vehicle. This acts as a check upon the correct operation of the mechanical transmission between axle 16 and shaft 14 at all times.

The electrical arrangement of the coil 55 of air valve 54 is such that upon a momentary interruption of its circuit the air valve will be opened and will not again close until reset by hand or by other extraneous method. So long as this circuit is maintained closed the brakes are unaffected but upon this circuit being deënergized the air valve 54 is adapted to make an application of the brakes by allowing air to escape from the train line. It is obvious that various forms of air valves may be used for this purpose.

The operation of the device is as follows:

Referring to the figures it will be seen that in Fig. 1 the track circuit is shunted and the relay 9 is deënergized. The deenergization of relay 9 will open contact 10 and disconnect a source of energy 53 from the coil 25 and allow the clutch members 15 and 20 to come into engagement. The shaft 14 is rotated as hereinbefore described in a counter clockwise direction at a speed in direct proportion to the speed of the train. In view of the engagement of clutch members 15 and 20 this motion will now be transmitted to shaft 17 and this will also be caused to rotate in a counter clockwise direction in proportion to the speed of the train. This will cause pinion 26 to be rotated in a counter clockwise direction which motion will be transmitted through gear and pinion 27 to gear 29 which will also rotate in a counter clockwise direction, winding up the spring 31. The rotation of gear 29 will further rotate pinion 33 thereby causing gear 34 to be rotated in a clockwise direction, carrying with it the dial 35 which is provided with a stop 66 which is normally in engagement with the bearing member 19. Collar 48 on shaft 17 will be rotated in a counter clockwise direction and the spring-retained tripper 49 will be caused to engage pin 47 on fly wheel 44 causing this fly wheel to rotate in unison with the shaft 17. When the tripper 49 engages with the projection 52 on frame 13 it will be depressed and will be released from engagement with pin 47 on fly wheel 44. However, fly wheel 44 will continue to rotate in a counter clockwise direction a definite distance in proportion to the speed at which the shaft 17 was rotating at the time of the release of the pin 47. The fly wheel 44 will eventually cease to rotate and will reverse its direction of rotation being returned by means of the counterweight 46 to its original position with member 45 resting against stop 67. This oscillation of fly wheel 44 will continue during the rotation of shaft 17 the extent of oscillation varying in accordance with the speed of rotation of shaft 17 and hence in proportion to the speed of travel of the vehicle.

It will be seen from the above that the disk 35 has been caused to rotate a definite amount in direct proportion to the distance traveled by the train in a clockwise direction with each revolution of the shaft 17. It will further be seen that with each revolution of the shaft 17 the fly wheel 44 will be caused to make an arc of travel in a counter clockwise direction which up to a definite point will be in accord with the distance traveled, that is up to the point of release of pin 47, and from this point on it will make an arc of motion due to inertia which will proportionally represent the necessary retardation effect to reduce the speed of the vehicle to zero at the predetermined stopping point. It will therefore be seen that the member 45 carried on fly wheel 44 will indicate on the scale on dial 35, the remaining distance to the required stopping point at the point of release of the pin 47, and at the reversing point of movement will indicate the marginal distance remaining above the braking distance. This cycle of events will obtain until eventually the pointer 45 will strike flexible contact arm 38 forcing the same away from the contact pin 39. This will open the circuit to coil 55 of air valve 54 and will apply the brakes.

It is obvious that should the engineer at any time during this cycle of events exceed his permissible speed the pointer 45 will strike contact arm 38 and force it away from the contact pin 39, thereby automatically compelling the engineer to either conform to a safe retardation curve as determined by the inertia of a suitably balanced and proportioned fly wheel or else to be stopped by the mechanism.

It will be seen that shaft 17 is rotating in the same direction as the fly wheel 44 when it is operating in the direction to open the contacts 38 and 39. Therefore any excessive friction in the ball bearings 42 and 43 will tend to increase the stroke of the fly wheel 44 and thereby give an earlier application than is necessary. It is obvious that this feature is on the safe side and in conformation with railroad practice.

Upon relay 9 becoming again energized contact 10 will be closed thereby energizing clutch coil 25 and releasing the clutch members 15 and 20. This will leave the mechanism free to be returned to its normal position due to the unwinding action of spring 31.

It will be understood that while I have disclosed one specific form of construction of my device many modifications may be made in the same without departing from the broad spirit of the invention.

What I claim is:—

1. In a speed controlling device, a vehicle, a shaft thereon adapted to be rotated at a speed proportionate to the speed of travel of the vehicle, a second shaft, a clutch member between said first and second shafts adapted to be controlled by conditions in advance of the vehicle, a tripper on said second shaft, a member having predetermined inertia and adapted to be oscillated by said tripper with a varying amplitude in accordance with the speed of rotation of said second shaft, a second member adapted to be moved relative to the path of oscillation of said first member and in accordance with the distance traveled by the vehicle, a contact carried by said second member, a brake controlling circuit controlled by said contact, and means whereby upon the operation of said clutch member said contact is operated to control the brakes of the vehicle should the angle of oscillation of the first member not be reduced to accord with the movement of said second member.

2. In a system of speed control, a track, a vehicle for travel thereon, means on the vehicle responsive to track conditions in advance, distance controlled means on the vehicle adapted to be operated in direct proportion to the distance traveled by the vehicle, coöperating speed controlled means adapted to be oscillated at an amplitude in proportion to the speed of travel of the vehicle, and means jointly controlled by the distance controlled means and speed controlled means whereby upon the operation of the means responsive to track conditions the brakes of the vehicle will be applied if the speed of the vehicle is not reduced in accordance with a predetermined retardation curve.

3. In a system of speed control, a track, a vehicle for travel thereon, a circuit on said vehicle, means for controlling said circuit from said track, a shaft on the vehicle adapted to be rotated at a speed proportionate to the speed of travel of the vehicle, a second shaft, a clutch member between said first and second shafts adapted to be controlled by the circuit on the vehicle, a tripper on said second shaft, a member having inertia to accord with a predetermined rate of retardation of the vehicle and adapted to be oscillated by said tripper in accordance with the speed of rotation of said second shaft whereby the amplitude of oscillation will bear a definite relation to the speed of travel of the vehicle, a second member adapted to be moved relative to the path of oscillation of the first member in accordance with the distance traveled by the vehicle, a contact on said second member, a brake controlling circuit including said contact and adapted to apply the brakes of the vehicle upon the opening of the same, and means whereby upon the deënergization of the first mentioned circuit on the vehicle the contact on said second member is opened by said first member should the angle of oscillation of the same exceed an angle which is determined by the travel of the second member whereby the brakes are automatically applied to the vehicle.

4. In a system of speed control, a track, a vehicle for travel thereon, means on the vehicle responsive to track conditions in advance, distance controlled means on the vehicle adapted to be operated in direct proportion to the distance traveled by the vehicle, coöperating speed controlled means adapted to be oscillated at an amplitude in proportion to the speed of travel of the vehicle, means under the control of the distance and speed controlled means for indicating permissible running conditions and means jointly controlled by the distance controlled means and speed controlled means whereby upon the operation of the means responsive to track conditions the brakes of the vehicle will be applied if the speed of the vehicle is not reduced in accordance with a predetermined retardation curve.

5. In a speed controlling device, a vehicle, a shaft thereon adapted to be rotated at a speed proportionate to the speed of travel of the vehicle, a second shaft, a clutch member between said first and second shafts, a tripper on said second shaft, a fly wheel freely mounted on said second shaft and adapted to be oscillated by said tripper with a varying amplitude in accordance with the speed of rotation of said second shaft, a second member freely mounted on said second shaft, a train of gears between said second shaft and said second member to cause the same to rotate at a speed in definite relation to the speed of rotation of the second shaft, a contact carried by said second member, a brake controlling circuit controlled by said contact, and means whereby upon the operation of said clutch member, said contact is operated to control the brakes of the vehicle should the angle of oscillation of the fly wheel not be reduced to accord with the movement of said second member.

6. In a speed controlling device, a vehicle, an axle of said vehicle, a shaft on the vehicle adapted to be rotated in a uniform direction at a speed proportionate to the speed of travel of the vehicle, synchronous commutating means on said axle and said shaft whereby their relative speed of rotation is constantly checked by the maintenance of a closed circuit, a second shaft, a clutch member between said first and second shafts, a tripper on said second shaft, a fly wheel freely mounted on said second shaft and adapted to be oscillated by said tripper with a varying amplitude in accordance with the speed of rotation of said second shaft, a second member freely mounted on said second shaft, a train of gears between said second shaft and said second member to cause the same to rotate at a speed in definite relation to the speed of rotation of the second shaft, a contact carried by said second member, a brake controlling circuit including the first mentioned commutating means, and controlled by said contact, and means whereby upon the operation of said clutch member said contact is operated to control the brakes of the vehicle should the angle of oscillation of the fly wheel not be reduced to accord with the movement of said second member.

7. In a speed controlling device, a vehicle, a shaft thereon adapted to be rotated at a speed proportionate to the speed of travel of the vehicle, a second shaft, a clutch member between said first and second shafts, a tripper on said second shaft, a fly wheel freely mounted on said second shaft, and adapted to be oscillated by said tripper with a varying amplitude in accordance with the speed of rotation of said second shaft, a second member freely mounted on said second shaft, a train of gears between said second shaft and said second member to cause the same to rotate at a speed in definite relation to the speed of rotation of the second shaft, means under the control of the distance and speed controlled means for indicating the permissible running conditions, a contact carried by said second member, a brake controlling circuit controlled by said contact, and means whereby upon the operation of said clutch member said contact is operated to control the brakes of the vehicle should the angle of oscillation of the fly wheel not be reduced to accord with the movement of said second member.

8. In a speed controlling device, a vehicle, an axle of said vehicle, a shaft on the vehicle adapted to be rotated in a uniform direction at a speed proportionate to the speed of travel of the vehicle, synchronous commutating means on said axle and shaft whereby their relative speed of rotation is constantly checked by the maintenance of a closed circuit, a second shaft, a clutch member between said first and second shafts, a tripper on said second shaft, a fly wheel freely mounted on said second shaft and adapted to be oscillated by said tripper with a varying amplitude in accordance with the speed of rotation of said second shaft, a second member freely mounted on said second shaft, a train of gears between said second shaft and said second member to cause the same to rotate at a speed in definite relation to the speed of rotation of the second shaft, means under the control of the distance and speed controlled means for indicating the permissible running conditions, a contact carried by said second member, a brake controlling circuit including the first mentioned commutating means and controlled by said contact, and means whereby upon the operation of said clutch member said contact is operated to control the brakes of the vehicle should the angle of oscillation of the fly wheel not be reduced to accord with the movement of said second member.

9. In a speed controlling device, a vehicle, a shaft thereon adapted to be rotated at a speed proportionate to the speed of travel of the vehicle, a second shaft, a clutch member between said first and second shafts adapted to be controlled by track conditions in advance of the vehicle, a tripper on said second shaft, a member having predetermined inertia and adapted to be oscillated by said tripper with a varying amplitude in accordance with the speed of rotation of said second shaft, a second member adapted to be moved relative to the path of oscillation of said first member and in accordance with the distance traveled by the vehicle, a contact carried by said second member, a brake controlling circuit controlled by said contact, means whereby upon the operation of said clutch member said contact is operated to control the brakes of the vehicle should the angle of oscillation of the first member not be reduced to accord with the movement of said second member, and means for returning said second member to its normal position upon the release of the clutch.

10. In a system of speed control, a track, a vehicle for travel thereon, means on the vehicle responsive to track conditions in advance, distance controlled means on the vehicle adapted to be operated in direct proportion to the distance traveled by the vehicle, coöperating speed controlled means adapted to be oscillated at an amplitude in proportion to the speed of travel of the vehicle, means jointly controlled by the distance controlled means and speed controlled means whereby upon the operation of the means responsive to track conditions the brakes of the vehicle will be applied if the speed of the vehicle is not reduced in accordance with a predetermined retardation curve, and means for returning said second member to its normal position upon the return of the means responsive to track conditions to its initial condition.

11. In a speed controlling device, a vehicle, a shaft thereon adapted to be rotated at a speed proportionate to the speed of travel of the vehicle, a second shaft, a clutch member between said first and second shafts, a tripper on said second shaft, a fly wheel freely mounted on said second shaft and adapted to be oscillated by said tripper with a varying amplitude in accordance with the speed of rotation of said second shaft, a second member freely mounted on said second shaft, a train of gears between said second shaft and said second member to cause the same to rotate at a speed in definite relation to the speed of rotation of the second shaft, a contact carried by said second member, a brake controlling circuit controlled by said contact, means whereby upon the operation of said clutch member said contact is operated to control the brakes of the vehicle should the angle of oscillation of the fly wheel not be reduced to accord with the movement of said second member, and means for returning said second member to its normal position upon the release of the clutch.

12. In a speed controlling device, a vehicle, an axle of said vehicle, a shaft on the vehicle adapted to be rotated in a uniform direction at a speed proportionate to the speed of travel of the vehicle, synchronous commutating means on said axle and shaft whereby their relative speed of rotation is constantly checked by the maintenance of a closed circuit, a second shaft, a clutch member between said first and second shafts, a tripper on said second shaft, a fly wheel freely mounted on said second shaft and adapted to be oscillated by said tripper with a varying amplitude in accordance with the speed of rotation of said second shaft, a second member freely mounted on said second shaft, a train of gears between said second shaft and said second member to cause the same to rotate at a speed in definite relation to the speed of rotation of the second shaft, a contact carried by said second member, a brake controlling circuit including the first mentioned commutating means and controlled by said contact, means whereby upon the operation of said clutch member said contact is operated to control the brakes of the vehicle should the angle of oscillation of the fly wheel not be reduced to accord with the movement of said second member, and means for returning said second member to its normal position upon the release of the clutch.

13. In a speed controlling device, a vehicle, an axle of said vehicle, a shaft on said vehicle adapted to be rotated in a uniform direction at a speed proportionate to the speed of travel of the vehicle, synchronous commutating means on said axle and shaft whereby their relative speed of rotation is constantly checked by the maintenance of a closed circuit, a second shaft, a clutch member between said first and second shafts, a tripper on said second shaft, a fly wheel freely mounted on said second shaft and adapted to be oscillated by said tripper with a varying amplitude in accordance with the speed of rotation of said second shaft, a second member freely mounted on said second shaft, a train of gears between said second shaft and said second member to cause the same to rotate at a speed in definite relation to the speed of rotation of the second shaft, means under the control of the distance and speed controlled means for indicating the permissible running conditions, a contact carried by said second member, a brake controlling circuit including the first mentioned commutating means and controlled by said contact, means whereby upon the operation of said clutch member said contact is operated to control the brakes of the vehicle should the angle of oscillation of the fly wheel not be reduced to accord with the movement of said second member, and means for returning said second member to its normal position upon the release of the clutch.

14. In a speed controlling device, a vehicle, a shaft thereon adapted to be rotated at a speed proportionate to the speed of travel of the vehicle, a second shaft, a clutch member between said first and second shafts, a tripper on said second shaft, a fly wheel freely mounted on said second shaft and adapted to be oscillated by said tripper with a varying amplitude in accordance with the speed of rotation of said second shaft, a second member freely mounted on said second shaft, a train of gears between said second shaft and said second member to cause the same to rotate at a speed in definite relation to the speed of rotation of the second shaft, means under the control of the distance and speed controlled means for indicating the permissible running conditions, a contact carried by said second member, a brake controlling circuit controlled by said contact, means whereby upon the operation of said clutch member said contact is operated to control the brakes of the vehicle should the angle of oscillation of the fly wheel not be reduced to accord with the movement of said second member, and means for returning said second member to its normal position upon the release of the clutch.

15. In a speed controlling device for railway vehicles, an element periodically retarded from a speed proportional to the vehicle speed in such a manner that the distance traversed by said element during retardation indicates the distance required to bring the train to rest; a second element indicating, by movement proportional to the travel of the vehicle, the distance available for stopping the vehicle, and means associated with the first and second elements for indicating the margin between the required distance and the available distance.

16. In a speed controlling device for railway vehicles, an element periodically retarded from a speed proportional to the vehicle speed in such a manner that the distance traversed by said element during retardation indicates the distance required to bring the train to rest; a second element indicating, by movement proportional to the travel of the vehicle, the distance available for stopping the vehicle, and means associated with the first and second elements for automatically controlling the train when the available distance has been reduced to the required distance.

17. In a speed controlling device for railway vehicles a revolving member driven at a speed proportional to the speed of the vehicle from an axle of the vehicle, a mechanism driven thereby to determine when brakes should be applied in accordance with the speed of the revolving member and a brake system controlled by a closed electric circuit comprising synchronous commutating devices on the axle and the revolving members whereby their relative rotation is constantly checked.

In testimony whereof, I have signed my name to this specification.

ELI J. BLAKE.